US008730238B2

(12) United States Patent
Salemann et al.

(10) Patent No.: US 8,730,238 B2
(45) Date of Patent: May 20, 2014

(54) VISUAL THREE DIMENSIONAL SIMULATION SYSTEM AND METHOD

(75) Inventors: Leo Salemann, Sammamish, WA (US); Eduard Rotenberg, Groton, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 837 days.

(21) Appl. No.: 12/913,488

(22) Filed: Oct. 27, 2010

(65) Prior Publication Data

US 2012/0105451 A1    May 3, 2012

(51) Int. Cl.
*G06T 17/00*    (2006.01)

(52) U.S. Cl.
USPC .......................................... 345/424; 345/419

(58) Field of Classification Search
USPC ................................................ 345/419, 424
See application file for complete search history.

(56) References Cited

U.S. PATENT DOCUMENTS

| 7,860,344 | B1* | 12/2010 | Fitzpatrick et al. | 382/291 |
|---|---|---|---|---|
| 2003/0219146 | A1* | 11/2003 | Jepson et al. | 382/103 |
| 2009/0048811 | A1* | 2/2009 | Kronhamn | 703/2 |
| 2009/0190798 | A1* | 7/2009 | Lee et al. | 382/103 |
| 2009/0315839 | A1* | 12/2009 | Wilson et al. | 345/173 |
| 2012/0059378 | A1* | 3/2012 | Farrell | 606/80 |

* cited by examiner

*Primary Examiner* — Jeffrey Chow
(74) *Attorney, Agent, or Firm* — Terry M. Sanks; Beusse Wolter Sanks Mora & Maire, P.A.

(57) ABSTRACT

A system and method receive an object representative of a new element of a scene to be simulated. A probabilistic prediction of coordinates of the new element in the scene is provided. The new element is placed in the scene as a function of rules for combining probabilistic nature objects in the scene. A visual representation of the simulated scene including the new element is also provided for display.

19 Claims, 4 Drawing Sheets

VISUAL THREE DIMENSIONAL SIMULATION SYSTEM AND METHOD

BACKGROUND

Traditional polygon/facet-based 3D modeling and visualization techniques are too rigid to model and visualize uncertain spatial information. A facet by nature constrains a portion of space into a 2D plane. An object modeled by a collection of facets thus constrains where the object begins and ends. The vertices of the facets collectively describe only one position where the object can be located.

SUMMARY

A system and method receive an object representative of a new moving element of a scene to be simulated. A probabilistic prediction of coordinates of the new element in the scene is provided. The new element is placed in the scene as a function of rules for combining probabilistic nature objects in the scene. A visual representation of the simulated scene including the new element is also provided for display.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
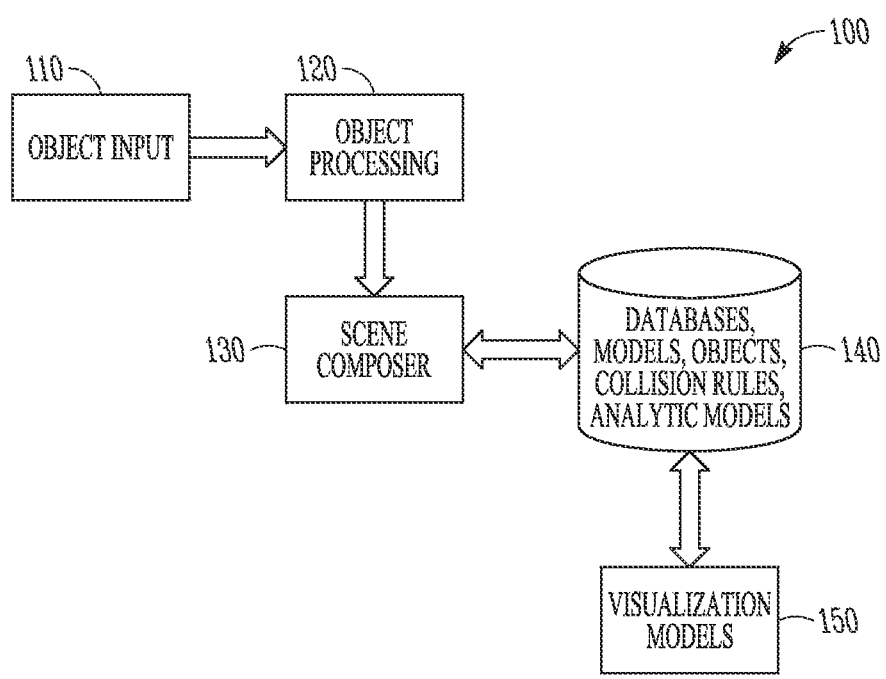
FIG. 1 is a block diagram of a scene simulation system according to an example embodiment.

A flexible modeling and visualization system is driven by a probabilistic approach to volumetric modeling. A scene can be composed of a set of objects, where the existence and location of each object is defined probabilistically. This model captures the inherent uncertainty in measuring and predicting position and motion. A spatio-probabilistic model (SPM) enables the development of systems which can reason with spatial uncertainty, and through machine learning, can form a 3D spatial model. SPMs provide for fast generation of real-life 3D models. SPMs, because of their database storage nature, present unlimited capabilities for merging visual information with information of other nature and presenting it in multitude of views. SPMs provide geographical representations of terrain combined with intelligence information. SPMs may also be combined with a Bayesian inference engine to assign probabilities of the likelihood of the composition of the scene in the simulation. In one embodiment, the system includes one or more of the following components:

1. Procedure for scene composition: adding new SPM based objects to SPM based scene.
2. Procedure for probabilistic predicting scene's coordinates for SPM based moving objects not currently presenting on a scene.
3. Database of SPM based standard objects for scene insertion-like moving vehicles, aircrafts, ships, peoples, trees, environmental objects, etc.
4. Database of SPM based collision rules and analytic models.
5. Database of models predicting time evolution of SPM parameters for static and moving scene objects (aging, damage, growth, etc.)
6. Procedure for SPM based scene classification: dividing scene to voxel's clusters and assigning appropriate visual model for each cluster
7. Procedure for calculation of average probability of composed scene
8. Procedure for inclusion discounted human sources information (HIS)
9. Procedure for inclusion SPM objects presented as a sequence of 2D images FIG. 1 is a block diagram illustrating a visual three dimensional simulation system 100 that includes a spatio-probabilistic model (SPM). System 100 receives objects at 110 that represent a scene to be simulated. The objects are processed at 120 to identify various object types, whether they are coming from physical sensors or originated from human source, whether they are moving, if they are moving, predicting where they will move to, and applying evolution algorithms to synchronize objects in the scene. A scene composer 130 scales voxel (three dimensional pixels) sizes of the objects and applies rules for collisions and combinations of the objects. SPM probabilities combination rules are also applied, interfacing with a database 140 that stores scenes, time evolution models, standard objects for inserting in scenes, as well as collision rules and analytic models. Visualization models are provided at 150.

Figure 2:
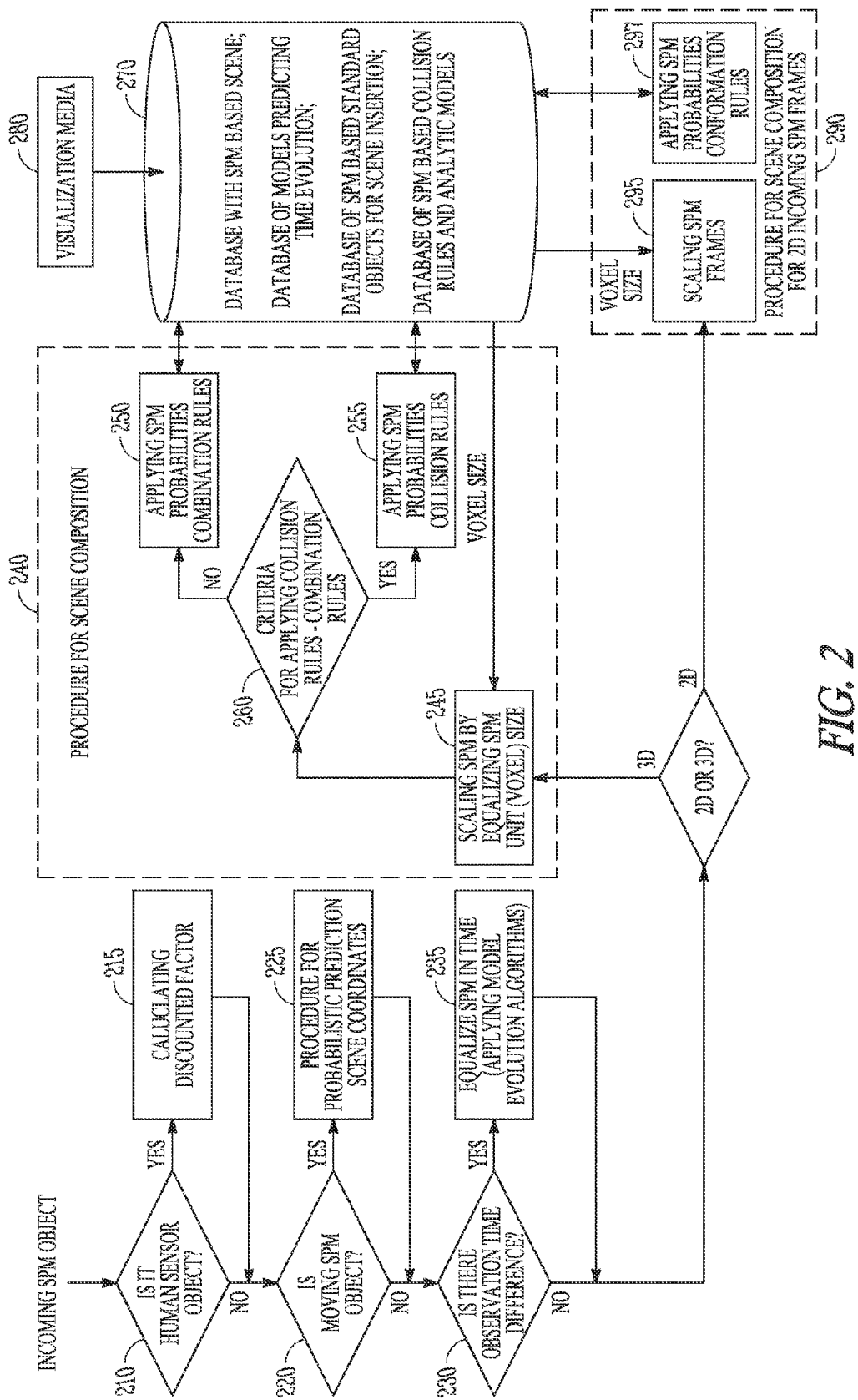
FIG. 2 is a block flow diagram illustrating procedures for composing scenes using spatio-probabilistic models according to an example embodiment.

FIG. 2 provides further details of algorithms and procedures that are performed by system 100. Incoming 3D or 2D objects are received at 210 and if an object is provided by a human information source (HIS), a procedure is provided for calculating a discounted factor at 215. If an image is identified as originating from a human source, it is usually accompanied by a probability value, Ptrust. Ptrust indicates a level of trust to be given the source of image. Then such image may be merged with a discount in reverse proportion to Ptrust.

Because intelligence information is coming from multiple sources, Bayesian probability inference methods may be used in some embodiments to calculate a final probability value. Data from physical and human sensors may be combined in one embodiment. Both types of data are characterized by a certain level of noise which influences the level of accuracy; although the primary causes of noise are quite different in nature. The physical sensor noise depends mostly on the accuracy of underlined physical principles of measurements, sensors' design precision, etc. Technically, a physical sensor's accuracy is usually defined by using statistical means in terms of probability distribution (usually normal) with certain level of variance. A human sensor is a human being. The five human senses are the 'sensor apertures.' Human perception and cognition are the 'sensor processing,' and a spoken, written, or drawn description of the observed object(s) and/or event(s) are the sensor output.

The accuracy of human sensors is defined by some combination of the following, deception by the human source, 'honest error' by the human source, and poor understanding of situation or context. Human sensors may be scrutinized with respect to opportunity, competence, and veridicality. Opportunity concerns whether the person was in a position to have observed the event or verified the fact. Competence concerns whether the source was capable of making the distinction in question. Veridicality concerns whether the source is telling the truth. In short, quantitative measures of the strength of evidence as the way to summarize and communicate the implications of large bodies of evidence are provided. A natural candidate for such summarization, with a long and respected intellectual tradition behind it, is probability.

Bayesian inference (statistical inference in which evidence or observations is used to update the probability that a hypothesis may be true) is used in evidential reasoning calculations. The accuracy of human sensors may be defined in statistical terms of probabilities. In various embodiments, visual image evidence data is accompanied by probabilities of their reliability.

For 3D objects HIS could be visible in two modes:
In a discounted mode—inclusion in the scene based on probability attached to $P_{HIS}$: Any voxel that belongs to a given HIS object may be included in the scene with the following parameters:

$$P_{occupancy} = P_{occupancy} * P_{HIS} \qquad 1)$$

$$P_{appear} = P_{appear} * P_{HIS} \qquad 2)$$

In a director mode, any voxel that belongs to a given HIS object may be included in the scene directly:

$$P_{occupancy} = P_{occupancy} \qquad 1)$$

$$P_{appear} = P_{appear} \qquad 2)$$

Existing object databases can be re-used for this system.

For 2D objects the following procedure may be used: Parameters of Gaussian distribution standard deviation $\sigma$ and mean $\mu$ of each affected voxel in database 270 are updated in accordance with the following formulas:

$$\omega_i^{t+1} = \omega_i^t + \frac{1}{N+1}(\hat{p}(\omega_i^t \mid x_{N+1}) - \omega_i^t)$$

$$\mu_i^{t+1} = \mu_i^t + \frac{d\omega}{d\omega + \omega_i^t}(c - \mu_i^t)$$

$$(\sigma_i^{t+1})^2 = (\sigma_i^t)^2 + \frac{d\omega}{d\omega + \omega_i^t}((c - \mu_i^t)^2 - (\sigma_i^t)^2)$$

by elements of each image in sequence of incoming of 2D images $\{I_t\}$, Where $\omega$ is weight. It is updated following the above formula for image N+1 in sequence $\{I_t\}$.

This formula does not take into account uncertainty probability attached to human information source (HIS) data. This uncertainty will discount HIS information in according to the level given by HIS data probability and slow down converging process. As the result, the following modification of the above formula may be used for weight $\omega$:

$$\omega_i^{t+1} = \omega_i^t + \frac{1}{\psi(P_{HS})}(\hat{p}(\omega_i^t \mid x_{N+1}) - \omega_i^t) \qquad (1)$$

Where $\psi(P_{HS})$ is the function of HS uncertainty probability $P_{HS}$. This trivial function should be constructed such way that if HS probability increase then convergence increase and otherwise. For example $$\psi(P_{HS}) = k_1 e^{k_2 P_{HS}}$$

Figure 3:
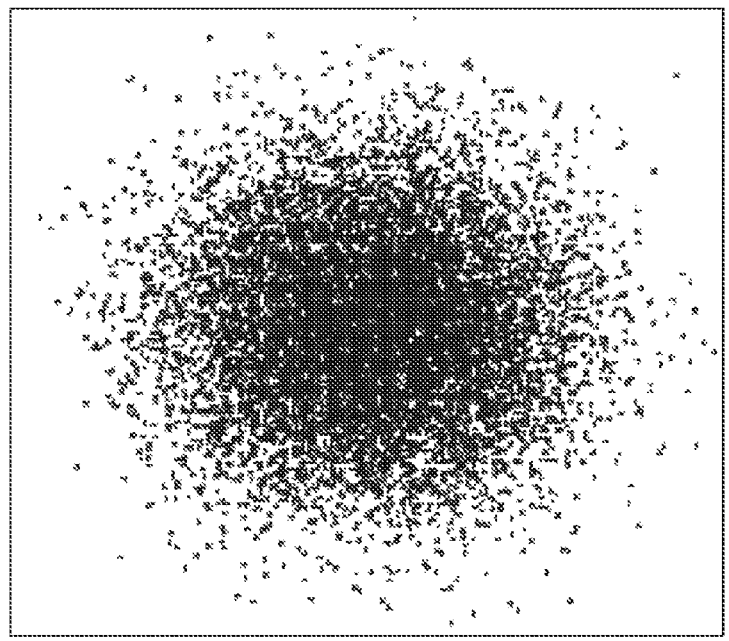
FIG. 3 is a graphic representation of a probable position of an element in a scene according to an example embodiment.

At 220, it is determined if the SPM object is a static or moving object. If the object is a moving object, a procedure for probabilistic prediction of the scene's coordinates for SPM based moving objects not currently presenting on a scene is performed at 225. Given a moving object whose position is sampled in time, for example, the position of a stolen car, it is known where the car was, but its exact position was not identified. This is important to know that the exact time when the car is stolen also was uncertain. At time t1 (stealing time) and position p1 (stealing position) that both of them are uncertain. The position of the car is not one point and it can be seen from many points as shown in a representation of probable position in FIG. 3.

Now, consider this object moving in a network and the police want to know p2(x,y), its new position 20 minute after stealing. If car moves at speed Vm from p1, its position at time t2 (selective time) will be between two circle of r1 and r2 around p1. r1 and r2 can be calculated as $$p_2 = p_1 + v_m(t_2 - t_1)$$

$$\begin{cases} x_2 = x_1 - v_{mx}t_1 + v_{mx}t_2 \\ y_2 = y_1 - v_{my}t_1 + v_{my}t_2 \end{cases}$$

As mentioned $x_1$, $y_1$ and $t_1$ are uncertain and have the following ranges:

$$x_{min} \le x_1 \le x_{max}$$

$$y_{min} \le y_1 \le x_{max}$$

$$t_{min} \le t_1 \le t_{max} \qquad (2)$$

Thus, to calculate $r_1$, $x_{min}$, $y_{min}$ and $time_{min}$ are used, and to calculate $r_2$, $x_{max}$, $y_{max}$ and $time_{max}$ are used. Therefore, $r_1$ and $r_2$ are computed as follows:

$$\begin{cases} r_1 = r_{min} = \sqrt{x_{2min}^2 + y_{2min}^2} \\ r_2 = r_{max} = \sqrt{x_{2max}^2 + y_{2max}^2} \end{cases}$$

Figure 4:
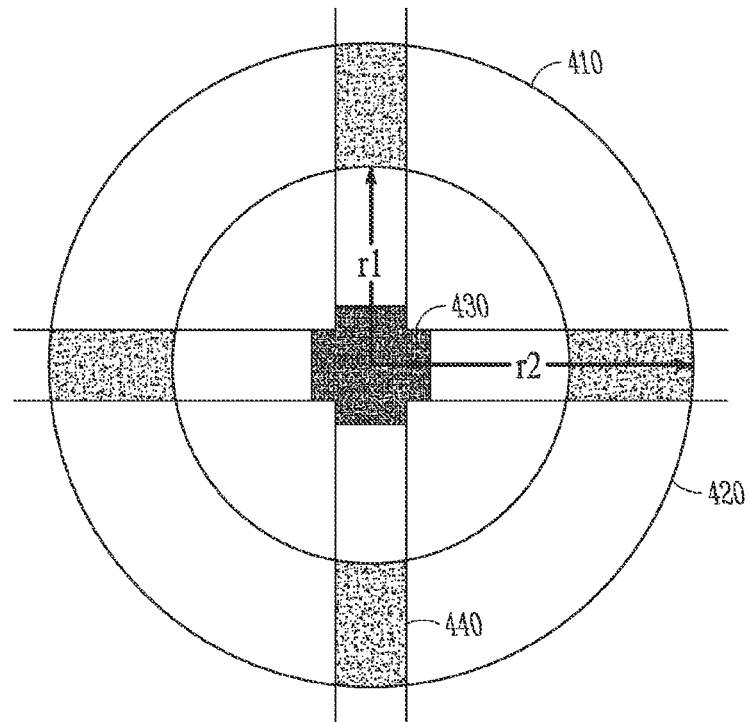
FIG. 4 is a graphic representation of an example probability of position of a car according to an example embodiment.

Thus, the position at time $t_2$ will be somewhere within the area bounded by two circles of radius $r_1$ and $r_2$ as seen in FIG. 4 at 410 and 420 respectively. A black area 430 in the center denotes p1 uncertain area in according to (2). Gray areas 440 inside r1, r2 area denotes hypothetical situation if car moved along straight roads.

Finally, the probability that car is inside particular area B, B<A can be calculated using Equation 1.

$$p_2(x,y) = \begin{cases} \dfrac{B}{A} & \text{when } x^2+y^2 \le r_1^2 \wedge x^2+y^2 \le r_2^2 \\ 0 & \text{otherwize} \end{cases} \quad (3)$$

where A is the area between two circles in FIG. 4.

Similar calculations are used for 3D moving objects in one embodiment. The equation (3) in this case will be replaced by:

$$p_2(x,y) = \begin{cases} \dfrac{BB}{AA} & \text{when } x^2+y^2+z^2 \le r_1^2 \wedge x^2+y^2+z^2 \le r_2^2 \\ 0 & \text{otherwize} \end{cases} \quad (4)$$

where AA is 3D area between two spheres r1, r2 and BB<AA particular 3D area inside AA.

The following possibilities exist for placing and visually presenting a moving object: Placing the moving object: put the object into a location calculated based on the mean value $p_2(x,y)$. All possible positions between $r_1$ and $r_2$ may also be shown. For a visual presentation, a probable location mode:

$P_{occupancy} = P_{occupancy, movinoject} * p_2(x,y)$    1)

$P_{appear} = P_{appear, moving\ object} * p_2(x,y)$    2)

For a direct mode:

$P_{occupancy} = P_{occupancy, moving\ object}$    1)

$P_{appear} = P_{appear, moving\ object}$    2)

At 230, it is determined if there is an observation time difference, or if a time stamp is not equal to a time stamp of a main portion of the scene. If the difference is substantial, the SPM is equalized in time, applying model evolution algorithms at 235. Many different models may be used for predicting time evolution of SPM parameters for static and moving scene objects (aging, damage, growth, etc.) For example, analytical aging models for scene objects:

$$\begin{cases} P_{occup} = P_{occup,0} e^{-k_{surf}(t-t_0)} \\ P_{appear} = P_{appear,0} e^{-k_{color}(t-t_0)} \end{cases}$$

Where t, to-time and starting time, symbol k denotes time constants.

At 240, a procedure for scene composition provides for adding new 3D SPM based objects to SPM based scene. The procedure consists of the following steps: Equalizing the voxel size for a voxel of an existing scene and new coming objects at 245. New objects are inserted into the existing scene by applying collision rules in procedure 255 and combination rules in procedure 250 based on criteria applied at 260. For combination rules we use the following procedure: Given two voxels: one is already present in the scene and another is entering the scene and part of the incoming object occupies the same space, three options are provided for selecting the voxel that will occupy the space:
    a. Leave untouched already existing voxel
    b. Use incoming voxel
    c. Use combination of both A majority of cases will present the combination of a not empty voxel with an empty type (atmospheric) of voxel or a combination of empty voxels. In this case, the outcome of voxel combinations at 250 is clear. In other cases, a not empty cases decision could be made based on both voxels internal parameters or with the help of additional semantic information about the object the voxel belongs to.

In the first case. Voxel parameters vector VPM consists of two components: VPM=($P_{occupancy}$, $P_{appearance}$), where $P_{occupancy}$ is the probability that a voxel is occupied and not an empty type (atmospheric), $P_{appearance}$ is the probability to describe voxel possible appearance. Examples include probability for grayscale, color (for human eye sensor), heat intensity (for thermal sensor) or spectral signature (for hyper spectral sensor). In general it is the manner in which a piece of solid matter stimulates a sensor.

Next, a function F defining vector $VPM_{out}$ of resulting voxel is defined as: $VPM_{out}=F(VPM_{existing}, VPM_{incoming})$ where $VPM_{existing}$–VPM vector of existing voxel, $VPM_{incoming}$–VPM vector of incoming voxel.

For example, in the simple non-equality case function F could be expressed by the following equation:

$$\begin{pmatrix} p_{occup} \\ p_{appear} \end{pmatrix}_{out} = \begin{pmatrix} P_{occup,exist}, & \text{if } P_{occup,exist} \ge P_{occup,in} \\ P_{occup,in}, & \text{if } P_{occup,exist} < P_{occup,in} \\ P_{appear,exist}, & \text{if } P_{appear,exist} \ge P_{appear,in} \\ P_{appear,exist}, & \text{if } P_{appear,exist} \ge P_{appear,in} \end{pmatrix}$$

In the second, the collision case for processing moving object, additional semantic information is added about the object the voxel belongs to. Binary collision logic and collision analytic models are applied at 255 for calculating the outcome of voxel combination.

In general the following function F is defined:

VPMout=F(VPMexisting, VPMincoming, collision rules, collision analytic models, voxels objects information). Collision rules and analytic model are defined based on simulation type and context. For example, if rules/models give full preference to existing terrain, then function F will leave untouched all existing terrain voxels coming into collision with incoming new not atmospheric voxels.

To speed up collision calculations, a VPM vector may be added to the following information: link to object voxel belongs to (collusion rules/analytic models usually defined on objects level), and the material the voxel/object is made of. Then vector VPM will have the following view:

$VPM = \{P_{occup}, P_{appear}, L_{obtbl}, L_{mattbl}\}$

Where: $L_{obtbl}$, $L_{mattbl}$ are links to scene object and material tables correspondingly.

Example scene object and material tables are shown below. A scene object tables includes an object type, velocity/acceleration parameters, voxel locations, and material table ID. A material table includes an ID, Type, resilience and color. Both tables may include further parameters as desired.

Scene Object Table

| ID | Object Type | Velocity/acceleration parameters | Voxels Locations | Material Table ID |
| --- | --- | --- | --- | --- |

Material Table

| ID | Type | resilience | Color |
| --- | --- | --- | --- |

At 290, a procedure for scene composition for 2D incoming SP images provides adding new objects represented by not empty sequence of images. The procedure consists of the following steps: Scaling incoming images at 295. At 297, parameters of Gaussian distribution standard deviation σ and mean μ of each affected voxel in database 270 updated in according to the following formulas:

$$\omega_i^{t+1} = \omega_i^t + \frac{1}{N+1}(\hat{p}(\omega_i^t \mid x_{N+1}) - \omega_i^t)$$

$$\mu_i^{t+1} = \mu_i^t + \frac{d\omega}{d\omega + \omega_i^t}(c - \mu_i^t)$$

$$(\sigma_i^{t+1})^2 = (\sigma_i^t)^2 + \frac{d\omega}{d\omega + \omega_i^t}((c - \mu_i^t)^2 - (\sigma_i^t)^2)$$

by elements of each image in sequence of incoming of 2D images $\{I_t\}$. Where ω is weight. If 2D image originated by human information source (HIS) then discounted weight $\omega_i^{t+1}$ is defined by formula (I).

A database 270 is used to store the scene, and also has models for predicting time evolution of objects within the scene. In some embodiments, database 270 includes SPM based standard objects for scene insertion. Common objects like moving vehicles, aircrafts, ships, peoples, trees, environmental objects, etc., may be re-used. Such objects may be used to speed scene simulation when an object is identified as in a class of common elements of a scene.

The database 270 may also be used to store SPM based collision rules and analytic models for use by procedure 255. Multiple collision rules can apply. Consider voxel, object $0_1$ and object $0_2$. In this discussion, we mean object in the most generic sense of the term—terrain, vegetation, static man-made structure, moving vehicle,—any solid matter. Given voxel v, which is currently occupied by all or part of object $0_1$; and object $0_2$, which is also believed to occupy voxel v, any one of the following collision rules may apply:

Discard Reject $0_2$, maintain the current occupancy of $0_1$.

Replace Remove $0_1$, replace with $0_2$.

Relocate Move $0_2$ to another voxel $v_2$.

Displace Move $0_1$ to another voxel $v_2$; place $0_2$ into voxel v.

Visualization media 280 is coupled to the database 270 to provide various views of the simulated scene. Visualization media 280 may include simple computer driven display devices, such as monitors, and may also include head up displays now known or developed in the future to provide a user a view of the simulated scene.

In some embodiments, a procedure for SPM based scene classification may be provided. A scene is divided into clusters of voxel. An appropriate visual model may be assigned for each cluster.

A procedure for calculating an average probability, $P_{average}$, of a composed scene implements the following algorithm:

$$P_{Average} = \sum_{i=1}^{N} \omega_i * P_i, \text{ Where } \sum_{i=1}^{N} \omega_i = 1$$

Where N—number of objects defining scene contest, $\omega_i$—weight of i-th object importance. Other metrics may also be used, for example max/min metrics. Based on external consideration and object importance consideration of all participating objects, few or single one may be used. In general, $P_{average}$ may be interpreted as the probability of a simulated scenario.

Figure 5:
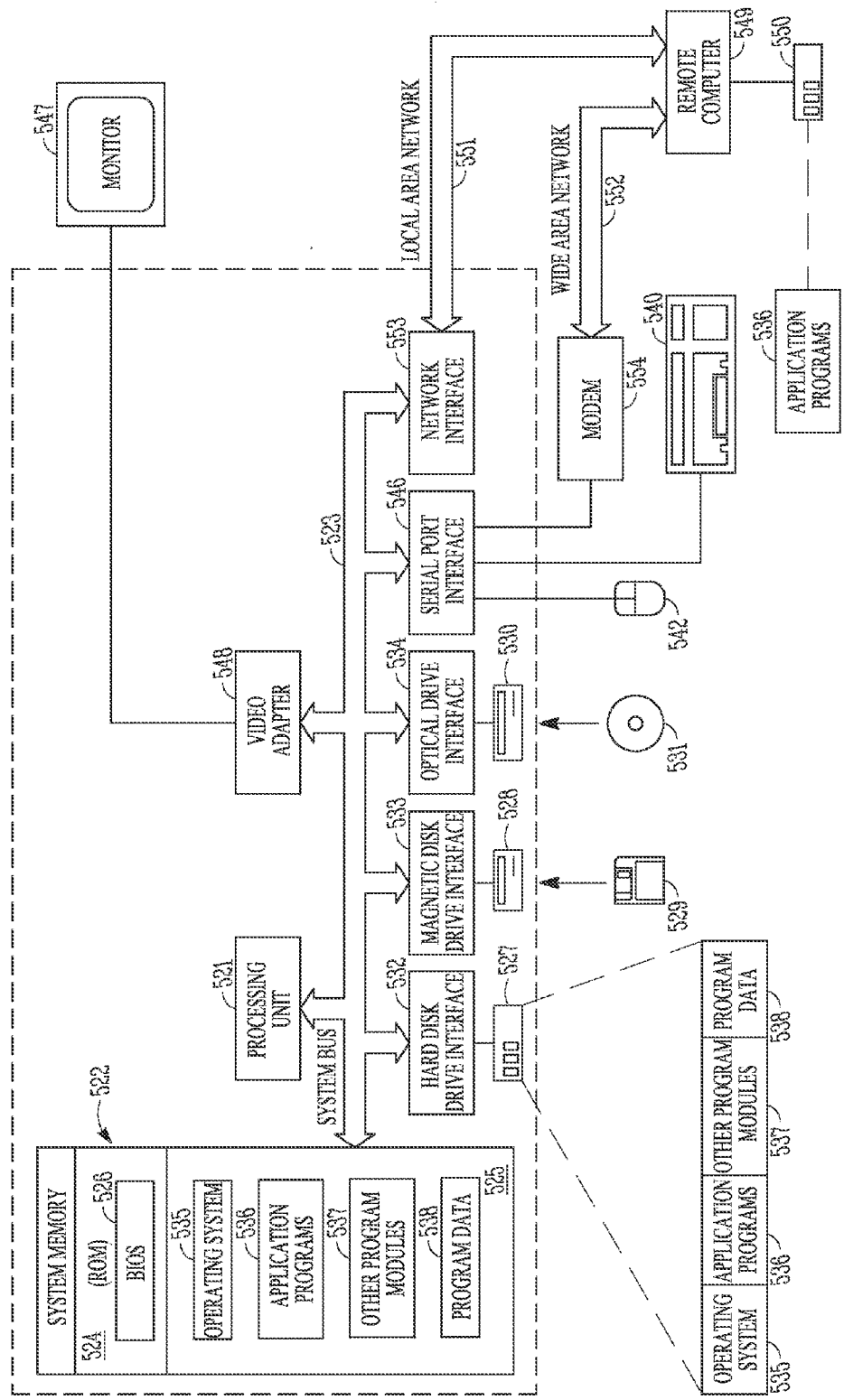
FIG. 5 is a block diagram of a computer system to implement procedures and algorithms according to an example embodiment.

A block diagram of a computer system that executes programming and procedures for performing the above algorithms is shown in FIG. 5. FIG. 5 is an overview diagram of a hardware and operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, procedures or program modules may be located in both local and remote memory storage devices.

As shown in FIG. 5, one embodiment of the hardware and operating environment includes a general purpose computing device in the form of a computer 520 (e.g., a personal computer, workstation, or server), including one or more processing units 521, a system memory 522, and a system bus 523 that operatively couples various system components including the system memory 522 to the processing unit 521. There may be only one or there may be more than one processing unit 521, such that the processor of computer 520 comprises a single central-processing unit (CPU), or a plurality of processing units, commonly referred to as a multiprocessor or parallel-processor environment. In various embodiments, computer 520 is a conventional computer, a distributed computer, or any other type of computer.

The system bus 523 can be any of several types of bus structures including a memory bus or memory controller, a peripheral bus, and a local bus using any of a variety of bus architectures. The system memory can also be referred to as simply the memory, and, in some embodiments, includes read-only memory (ROM) 524 and random-access memory (RAM) 525. A basic input/output system (BIOS) program 526, containing the basic routines that help to transfer information between elements within the computer 520, such as during start-up, may be stored in ROM 524. The computer 520 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 couple with a hard disk drive interface 532, a magnetic disk drive interface 533, and an optical disk drive interface 534, respectively. The drives and their associated computer-readable media devices provide non volatile storage of computer-readable instructions, data structures, program modules and other data for the computer 520. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 529, optical disk 531, ROM 524, or RAM 525, including an operating system 535, one or more application programs 536, other program modules 537, and program data 538.

A user may enter commands and information into computer 520 through input devices such as a keyboard 540 and pointing device 542. Other input devices (not shown) can include a microphone, joystick, game pad, satellite dish, scanner, or the like. These other input devices are often connected to the processing unit 521 through a serial port interface 546 that is coupled to the system bus 523, but can be connected by other interfaces, such as a parallel port, game port, or a universal serial bus (USB). A monitor 547 or other type of display device can also be connected to the system bus 523 via an interface, such as a video adapter 548. The monitor 540 can display a graphical user interface for the user. In addition to the monitor 540, computers typically include other peripheral output devices (not shown), such as speakers and printers.

The computer 520 may operate in a networked environment using logical connections to one or more remote computers or servers, such as remote computer 549. These logical connections are achieved by a communication device coupled to or a part of the computer 520; the invention is not limited to a particular type of communications device. The remote computer 549 can be another computer, a server, a router, a network PC, a client, a peer device or other common network node, and typically includes many or all of the elements described above I/0 relative to the computer 520, although only a memory storage device 550 has been illustrated. The logical connections depicted in FIG. 5 include a local area network (LAN) 551 and/or a wide area network (WAN) 552. Such networking environments are commonplace in office networks, enterprise-wide computer networks, intranets and the internet, which are all types of networks.

When used in a LAN-networking environment, the computer 520 is connected to the LAN 551 through a network interface or adapter 553, which is one type of communications device. In some embodiments, when used in a WAN-networking environment, the computer 520 typically includes a modem 554 (another type of communications device) or any other type of communications device, e.g., a wireless transceiver, for establishing communications over the wide-area network 552, such as the internet. The modem 554, which may be internal or external, is connected to the system bus 523 via the serial port interface 546. In a networked environment, program modules depicted relative to the computer 520 can be stored in the remote memory storage device 550 of remote computer, or server 549. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) is submitted with the understanding that it will not be used to interpret or limit the scope or meaning of the claims.

The following statements are potential claims that may be converted to claims in a future application. No modification of the following statements should be allowed to affect the interpretation of claims which may be drafted when this provisional application is converted into a regular utility application.

The invention claimed is:

1. A computer implemented method comprising: receiving an object representative of a new element of a scene to be simulated; providing a probabilistic prediction of coordinates of the new element in the scene; placing the new element in the scene as a function of rules for combining objects in the scene; and providing a visual representation of the simulated scene including the new element;
    wherein the combining rules for placing objects in the scene include leaving an existing voxel representing an element untouched, using an incoming voxel of the new element, and using a combination of both; and
    wherein the combination rules comprise spatio-probabilistic model probabilities rules.

2. The computer implemented method of claim 1 wherein the new element is moving.

3. The computer implemented method of claim 2 wherein providing a probabilistic prediction is a function of time and speed of the new element as represented by the object.

4. The computer implemented method of claim 3 wherein the prediction of position in the scene is a function of a probability that the new element is inside an area.

5. The computer implemented method of claim 1 wherein the new element is equalized in time with the scene.

6. The computer implemented method of claim 1 and further comprising using collision rules to place the new element in the scene.

7. The computer implemented method of claim 6 wherein the collision rules comprise spatio-probabilistic model rules.

8. The computer implemented method of claim 7 wherein the collision rules operate on voxels of the new elements represented by objects and discard, replace, relocate, or displace the voxels of the new element with second new element.

9. The computer implemented method of claim 1 and further comprising inserting a spatio-probabilistic model object into the scene from a database of such objects.

10. A system comprising: a procedure running on a computer to receive an object representative of a new element of a scene to be simulated; a procedure running on the computer to provide a probabilistic prediction of coordinates of the new element in the scene; a procedure running on the computer to place the new element in the scene as a function of rules for combining objects in the scene; and a device to provide a visual representation of the simulated scene including the new element:
    wherein the procedure to place the new element in the scene leaves an existing voxel representing an element untouched, using an incoming voxel of the new element, and using a combination of both; and wherein the procedure to place the new element in the scene utilizes spatio-probabilistic model probabilities rules.

11. The system of claim 10 wherein the object is representative of a the new element moving.

12. The system of claim 11 wherein providing a probabilistic prediction is a function of time and speed of the new element as represented by the object.

13. The system of claim 12 wherein the prediction of position in the scene is a function of a probability that the new element is inside an area.

14. The system of claim 10 and further comprising a procedure to equalize the new element in time with the scene.

15. The system of claim 10 and further comprising a procedure that uses collision rules to place the new element in the scene.

16. The system of claim 15 wherein the collision rules comprise spatio-probabilistic model rules.

17. The system of claim 16 wherein the collision rules operate on voxels of new elements represented by objects and discard, replace, relocate, or displace the voxels of the new element with a second new element.

18. The system of claim 10 and further comprising a procedure to insert a spatio-probabilistic model object into the scene from a database of such objects.

19. A computer readable device having instruction stored thereon to cause a computer to execute a method, the method comprising: receiving an object representative of a new element of a scene to be simulated; providing a probabilistic prediction of coordinates of the new element in the scene; placing the new element in the scene as a function of rules for combining objects in the scene wherein the rules for combining objects comprise, wherein the rules for combining objects comprise spatio-probabilistic model probabilities rules; and providing a visual representation of the simulated scene including the new element.

* * * * *